E. ST. JOHN.
AUTOMOBILE LOCK.
APPLICATION FILED MAY 29, 1917.
1,354,071.
Patented Sept. 28, 1920.
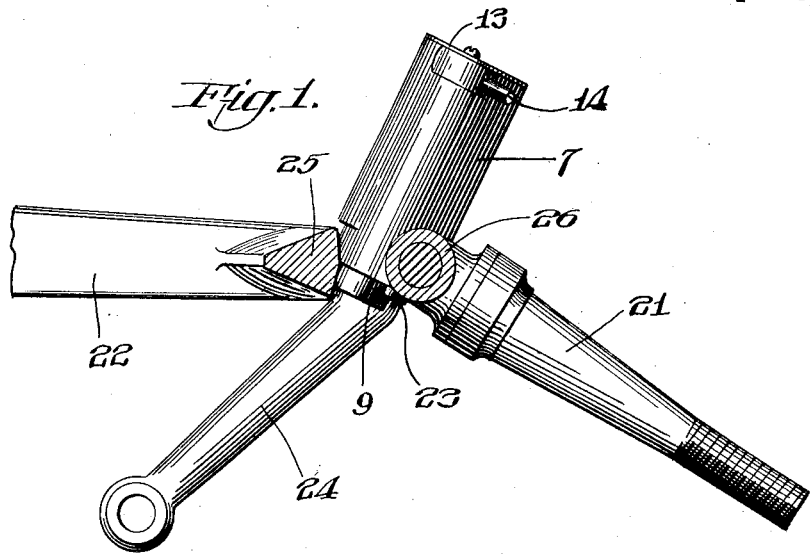
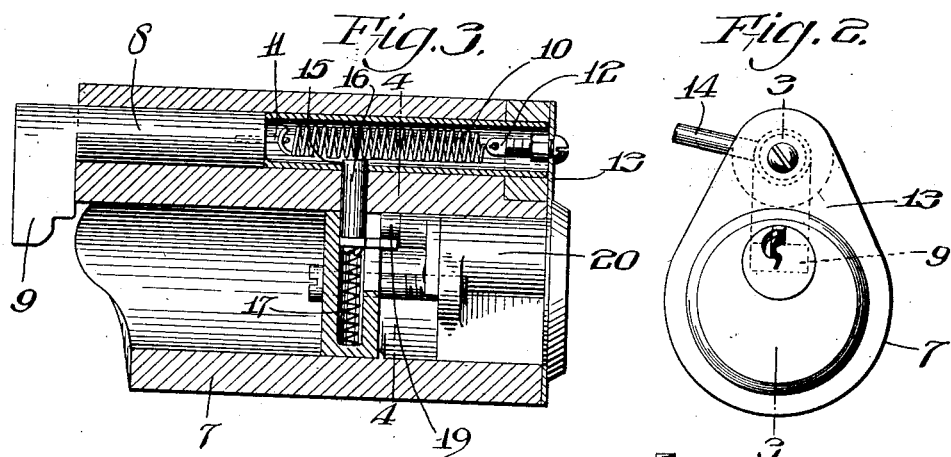
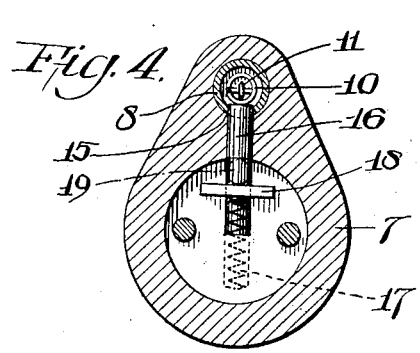
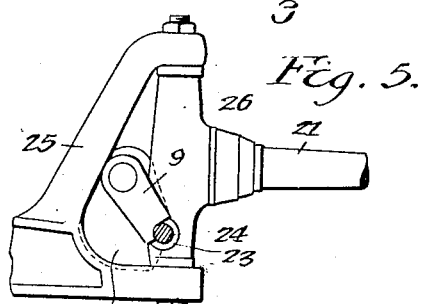
Inventor
Everett St. John
By [signature]
Attorney

UNITED STATES PATENT OFFICE.

EVERETT ST. JOHN, OF PHILADELPHIA, PENNSYLVANIA.

AUTOMOBILE-LOCK.

1,354,071.　　　　Specification of Letters Patent.　　Patented Sept. 28, 1920.

Application filed May 29, 1917. Serial No. 171,610.

*To all whom it may concern:*

Be it known that I, EVERETT ST. JOHN, a citizen of the United States, residing at Philadelphia, in the county of Philadelphia, State of Pennsylvania, have invented a new and useful Automobile-Lock, of which the following is a specification.

My invention relates to improvements in automobile locks. The object is to provide a self-containing organism which may readily be inserted between the relatively movable wheel supporting parts and locked in such position, and which may readily be removed from such position upon unlocking the same; said application being made without removing, displacing or in any way altering any part of the automobile.

Referring to the drawings, which illustrate merely by way of example a suitable embodiment of my invention:

Figure 1 is a plan view in part section showing my locking device in the operative position.

Fig. 2 is a front elevation on an enlarged scale.

Fig. 3 is a section on line 3, 3 of Fig. 2.

Fig. 4 is a section on line 4, 4 of Fig. 3.

Fig. 5 is an elevation on a reduced scale.

Similar numerals refer to similar parts throughout the several views.

The body 7 is provided with two parallel bores and forms a housing for a lock and lock actuating mechanism. In the upper bore is inserted shaft 8 of the detent or locking member 9. Shaft 8 is partly hollow to receive the spring 10 secured at one end to projection 11 connected with the shaft 8 and at the other end to the screw or threaded projection 12 supported on the stationary face plate 13. This spring 10 may be put under any required tension by turning screw 12 and serves normally to turn the shaft 8 and throw the detent 9 into neutral or unlocking position. The rod 14 is secured to the shaft 8 for manual operation against the tension of spring 10. The hollow portion of shaft 8 is also provided with an aperture 15 for receiving the bolt 16 actuated by spring 17. To bolt 16 is secured the arm or projection 18. The lever 19 is operated by the key in the lock 20. This lever 19 engages the projection 18 to depress the bolt against the spring tension 17.

In operation, when the bolt 16 is depressed the shaft 18 is released to turn in response to the actuation of spring 10 which moves the locking member 9 into the neutral or unlocking position. When it is desired to place the device into the operative position as shown in Fig. 1, the body portion 7 is inserted between the bracket 25 of the axle beam and the sleeve 26 of the axle when the axle 21 is at an angle with axle beam 22. In this position the pin 14 is operated to throw the locking member 9 into the locking position engaging the flange 23 of the steering arm 24. When brought into the locking position the aperture 15 of shaft 8 registers with the bolt 16 which permits said bolt 16 to enter the aperture 15 in response to the pressure of spring 17, thus locking the member 9 in position until the bolt is again actuated by means of the key in lock 20.

Merely as an example, the device has been shown as adapted to lock the axle at an angle with the axle beam so that the car can only be moved in a circular direction. It is obvious that the locking device may be adapted to lock the axle and the axle beam in any desired relative position to prevent the normal operation of the car.

What I claim is:—

1. An automobile lock comprising a body adapted to be inserted between the axle supporting sleeve and the sleeve supporting bracket and to be withdrawn therefrom, and locking means for securing said body in said inserted position.

2. An automobile lock comprising a body adapted to be inserted between the axle supporting sleeve and the sleeve supporting bracket and to be withdrawn therefrom, and a spring controlled member adapted to be manually operated against the actuation of the spring to lock said body in said position.

3. An automobile lock comprising a body adapted to be inserted between the axle supporting sleeve and the sleeve supporting bracket and removable therefrom, a spring actuated detent for securing the body in said position and a lock for controlling the detent.

4. An automobile lock comprising a body adapted to be inserted between the axle supporting sleeve and the sleeve supporting bracket when the axle is at an angle with the axle beam for maintaining said parts in said angular position, a detent and means for actuating same to lock said body in said position and to permit the withdrawal of the body from said position.

5. An automobile lock comprising a body adapted to be inserted between the axle supporting sleeve and the sleeve supporting bracket and to be withdrawn therefrom, a spring controlled member adapted to be manually operated against the actuation of the spring to lock said body in said position, and a spring controlled detent for automatically engaging the locking member when in locking position.

6. An automobile lock comprising a body adapted to be inserted between the axle supporting sleeve and the sleeve supporting bracket and to be withdrawn therefrom, a spring controlled member adapted to be manually operated against the actuation of the spring to lock said body in said position, a spring controlled detent for automatically engaging the locking member when in locking position, and key operated means for actuating the detent to release the spring controlled locking member to permit its return to inoperative position.

EVERETT ST. JOHN.